United States Patent [19]

Brown et al.

[11] Patent Number: 5,384,828
[45] Date of Patent: Jan. 24, 1995

[54] METHOD AND APPARATUS FOR SYNCHRONIZATION IN A WIRELESS TELEPHONE SYSTEM

[75] Inventors: David L. Brown, Miami, Fla.; Motjaba Aghaalian, Fort Worth, Tex.; Paul D. Marko, Ft. Lauderdale, Fla.

[73] Assignee: Motorola, Inc., Schaumburg, Ill.

[21] Appl. No.: 136,846

[22] Filed: Oct. 18, 1993

[51] Int. Cl.6 .................................... H04M 11/00
[52] U.S. Cl. .............................. 379/61; 379/63; 379/59; 379/60; 455/33.1
[58] Field of Search .................. 379/58, 59, 60, 61, 379/63; 455/33.1, 54.1, 51.1; 375/109, 116; 370/106

[56] References Cited

U.S. PATENT DOCUMENTS

| | | | |
|---|---|---|---|
| 4,876,740 | 10/1989 | Levine et al. | 455/51.1 |
| 5,081,679 | 1/1992 | Dert | 379/60 |
| 5,329,635 | 7/1994 | Wadin et al. | 379/60 |

OTHER PUBLICATIONS

ETSI discloses a CT2 Common Air Interface version 1.1, by European Telecommunications Standards Institute, France, Jun. 30, 1991, pp. 1-188.

*Primary Examiner*—Curtis Kuntz
*Assistant Examiner*—William Trost
*Attorney, Agent, or Firm*—Pedro P. Hernandez

[57] ABSTRACT

A resynchronization method for use in a communication system, such as a second generation cordless telephone system 800, begins by determining that synchronization has been lost by a receiving unit (830). The receiving unit than mutes any transmit data and generates zero data which is combined with a pattern generated by pattern generator (812). The transmission is then received by handset (830), which detects the pattern generated by pattern generator (812) using pattern detector (850). Pattern detector (850) then generates a pattern detected signal (852) which causes handset (840) to also stop sending data and generate a pattern accompanied by zero data. Base station (830) detects the pattern and again generates another pattern accompanied with zero data which is transmitted to handset (840). Handset (840) after decoding the pattern for the second time begins to resumes the normal transmission of data to base station (830).

16 Claims, 8 Drawing Sheets

FIG.1
(PRIOR ART)

| LINK SETUP DIRECTION | MESSAGE DIRECTION | MUX MODE | LID CONTENT |
|---|---|---|---|
| 102 CPP TO CPP | CPP-> CFP<br>CFP-> CPP<br>BOTHWAY | MUX3<br>MUX2<br>MUX2<br>MUX1 | END POINT ID<br>LINK REFERENCE ID<br>LINK REFERENCE ID |
| 104 CFP TO CPP | CFP-> CPP<br>CPP-> CFP<br>BOTHWAY | MUX2<br>MUX2<br>MUX2<br>MUX1 | BASE ID (BID)<br>BASE ID (BID)<br>LINK REFERENCE ID |
| 106 LINK RE-ESTABLISH | CPP-> CFP<br>BOTHWAY | MUX3<br>MUX2<br>MUX1 | LINK REFERENCE ID (LAST RECEIVED VALUE)<br>LINK REFERENCE ID |

MUX 3-LINK INITIATION
(GENERATED BY THE PORTABLE ONLY)

FIG. 3
(PRIOR ART)

MUX 2-LINK ESTABLISHMENT
(ALSO USED FOR LINK INITIATION FROM THE BASE)

FIG. 4
(PRIOR ART)

MUX 1-VOICE/DATA COMMUNICATIONS,
SIGNALLING INFORMATION, AND CONTROL
MESSAGES

FIG.5
(PRIOR ART)

```
         msb                                        lsb
      (SENT LAST)                              (SENT FIRST)
CHMF  1 0 1 1 . 1 1 1 0 . 0 1 0 0 . 1 1 1 0 . 0 1 0 1 . 0 0 0 0 (BE4E50H)
CHMF  0 1 0 0 . 0 0 0 1 . 1 0 1 1 . 0 0 0 1 . 1 0 1 0 . 1 1 1 1 (41B1AFH)
SYNCF 1 1 1 0 . 1 0 1 1 . 0 0 0 1 . 1 0 1 1 . 0 0 0 0 . 0 1 0 1 (EB1B05H)
SYNCP 0 0 0 1 . 0 1 0 0 . 1 1 1 0 . 0 1 0 0 . 1 1 1 1 . 1 0 1 0 (14E4FAH)
```

METHOD AND APPARATUS FOR SYNCHRONIZATION IN A WIRELESS TELEPHONE SYSTEM

TECHNICAL FIELD

This invention relates in general to communication systems, and more specifically to a method and apparatus for synchronization in a cordless telephone system.

BACKGROUND

Portable telephone systems, such as second-generation digital cordless telephone (CT2) systems, typically include multiple call point stations each providing multiple radio frequency (RF) channels. These call point stations are also referred to as telepoints or cordless fixed parts (CFPs). CFPs allow persons using portable telephone handsets (also known as cordless portable parts, CPPs), to access the public switched telephone network (PSTN). Access to the PSTN can occur when a CPP gets in the range of a telepoint (CFP) and after the CPP (handset) has established a synchronous link with the CFP (base station).

In a CT2 system, a handset initiating a call to a base station asynchronously transmits on one available channel of the handset's transceiver, which corresponds to a radio frequency (RF) channel in the base station (each base station being capable of supporting up to 40 channels).

In a typical CT2 system, the communication protocol standard includes four main burst structures, called multiplex 3 (MUX 3), multiplex 2 (MUX 2) and multiplex I (MUX 1) which is further subdivided into either multiplex 1.4 or 1.2 (MUX 1.4 or MUX 1.2). MUX 3 is utilized mainly for communication link initiation (link establishment and re-establishment) from a CPP to a CFP. MUX 2 is used primarily for communication link establishment and for link initiation from the base station(CFP). The MUX 1 burst structures (MUX 1.2 and MUX 1.4) are used primarily for voice/data communications, signaling information, and control messages from the CPP (portable) and CFP (base). For a better understanding of the overall CT2 system communication protocol, one is referred to a publication entitled, "Common air interface specification to be used for the interworking between cordless telephone apparatus in the frequency band 864.1 MHz to 868.1 MHz, including public access services", Version 1.1, dated 30th June 1991, which is published by the European Telecommunications Standards Institute and is hereby incorporated by reference.

Figure 1:
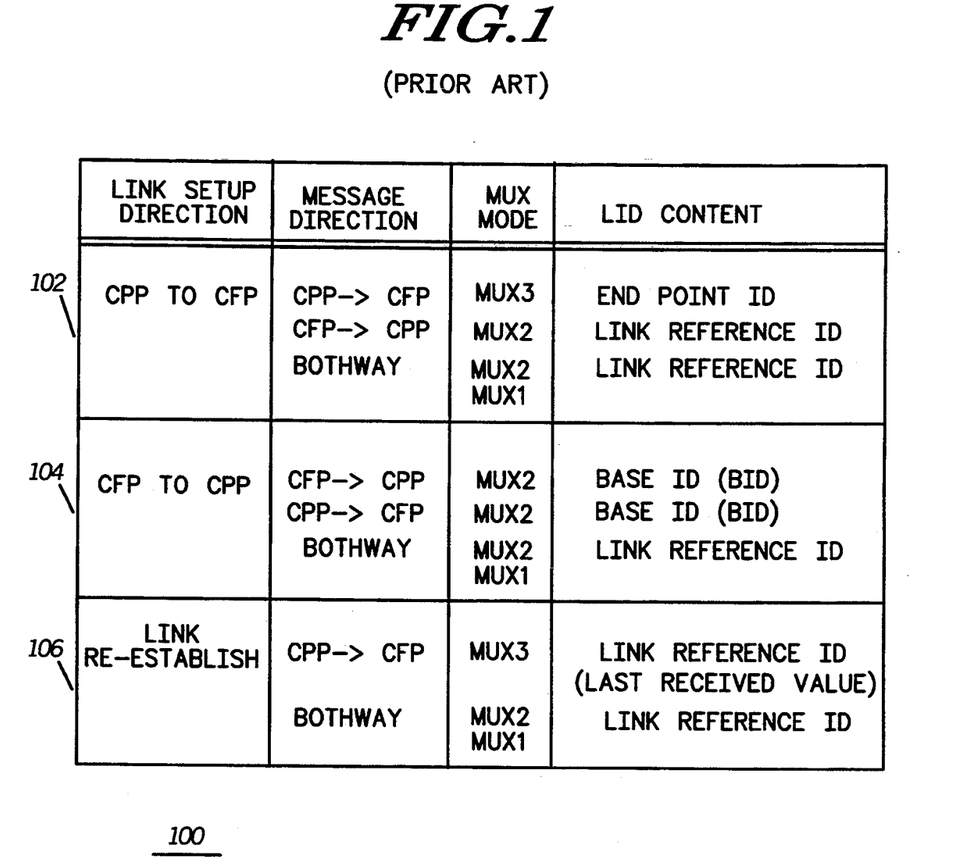
FIG. 1 shows a matrix of the prior art handshake sequence between a cordless telephone device (CPP) and a telepoint base station (CFP).

In FIG. 1, a table 100 showing the typical handshake sequences between a cordless portable part (CPP) and the telepoint base station (CFP) is shown. Table 100 shows the link setup direction, the message direction, MUX mode, and the content of the link identification code (LID) for each handshake sequence. The LID code is used for the following:

i). End point identification for CPP (handset) call setup;
ii). Link reference for associating CPP (handset) and CFP (base) calls during handshake exchanges and link re-establishments; and for iii). Base identifier (BID), which is the ringing address to which one or more CPP's will respond to.

Row 102 shows a basic sequence on how a handset (CPP) establishes communications with a telepoint (CFP), row 104 shows how a telepoint station establishes communications with a handset, and row 106 shows how a communication link is re-established in case the link is disrupted during an ongoing communication session. Looking for example at row 102, the sequence of events which occur in order to establish a communication link between a particular handset (CPP) and base station (CFP), is shown. The requesting handset (CPP) transmits in MUX 3 a message including the identification number of the handset (end point ID). This is followed by the base station transmitting in MUX 2 a message with the LID having the communication link reference identification number which informs the handset that the link has been granted.

Once the communication link establishment has occurred between the two units, the units go to the MUX 2 protocol where the CFP transmits a supervisory message and acknowledgment. The capabilities of both the CPP and CFP are determined, and authorization to use the system is determined by the CFP. The two units then move on to the MUX 1 protocol by a request from the CFP and an acknowledgment by the CPP. Once in MUX 1, dial tone is sent out by the CFP, the CPP then dials the telephone number he wishes to access. Finally, this is followed by a voice communication link being established between the CPP and the party at the dialed number telephone number. The voice communications are either transmitted using MUX 1.2 or MUX 1.4 format depending on the specific system 100 being utilized.

Figure 2:
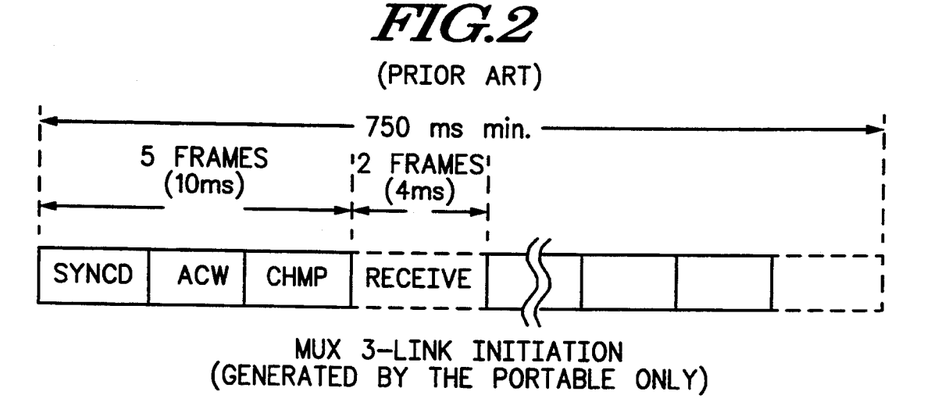
FIG. 2 shows a typical prior art MUX 3 link initiation protocol.
Figure 3:
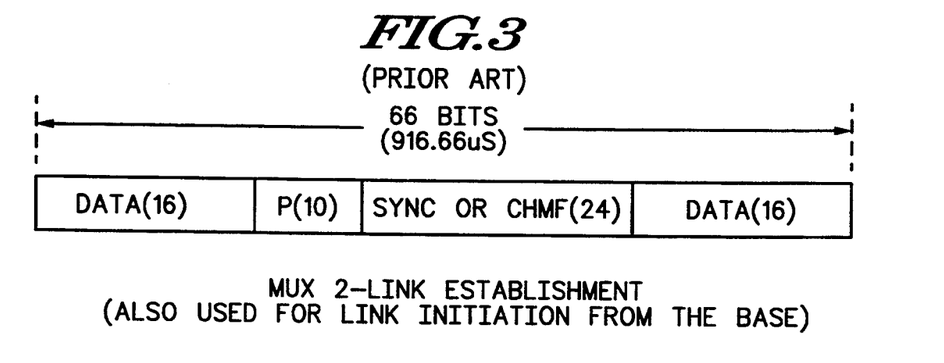
FIG. 3 shows a typical prior art MUX 2 link establishment protocol.

In FIG. 2, a simplified MUX 3 link initiation packet is shown. The two other important communication protocols utilized in a CT-2 communication system are MUX 2, shown in FIG. 3, and MUX 1 (implemented either via MUX 1.2, 2 bit signaling, or MUX 1.4, 4 bit signaling), shown in FIG. 4. MUX 2 is used after link initiation under MUX 3 has been achieved. MUX 2 is used to carry the D, or signaling channel information, and SYN, or synchronization channel information, for communication link establishment and re-establishment. B channel information which carries the 32 kbit/second speech or data is nonexistent in MUX 2. MUX 2 carries the D channel at a data rate of 16 kbit/second and the SYN channel at an overall rate of 17 kbit/second. The SYN channel consists of ten bits of preamble comprised of one and zero transitions followed by a channel marker (CHMF), or synchronization marker (SYNC). Data bits in the D channel are aligned in MUX 2 so that the D channel synchronization word, SYNCD, occurs as the first 16 bits in the D channel after the SYN channel.

Figure 5:
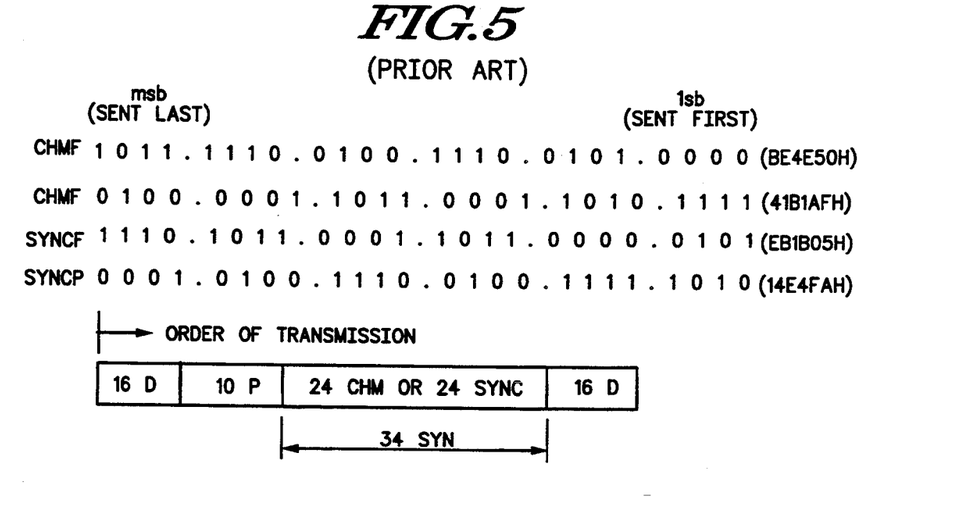
FIG. 5 shows a prior synchronization pattern for the MUX 2 protocol.

In FIG. 5, a prior art MUX 2 synchronization pattern is shown. When data is sent into the SYNC detector circuit of a communication device such as a CT2 cordless handset, and the data being received correlates to the synchronization pattern expected, the receive bit counter within the receiver is re-aligned to the correct position, and frame synchronization in MUX 2 is accomplished.

Figure 6:
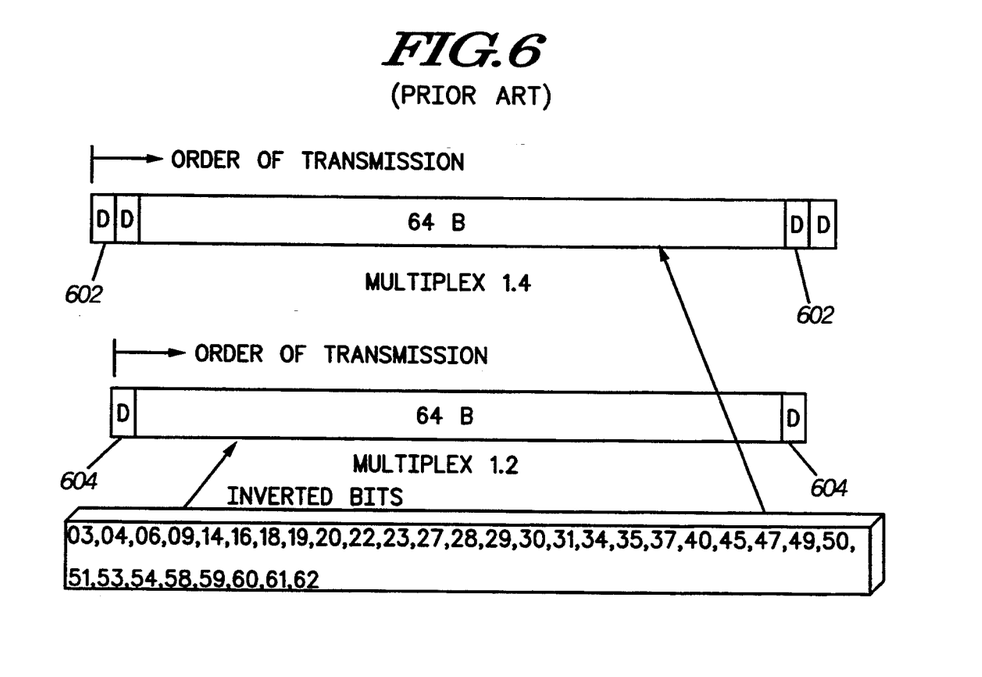
FIG. 6 shows a prior art inversion format for the MUX 1 protocol.

Referring to FIG. 6, a prior art MUX 1 communication packet highlighting the inversion bits is shown. In MUX 1 there are 2 D channel (data) bits and 64 B channel (voice bits). The SYN channel which is found in MUX 2 and 3 is not found in MUX 1. MUX 1 supports both the 68 bit and 66 bit burst structures (referred to as MUX 1.4 and MUX 1.2 for signaling with four data bits 602 or two data bits 604 respectively). In MUX 1.4 the valid transmitted data bits in a burst are numbered 1 to 68, and in MUX 1.2 they are numbered 2 to 67. In a CT2 system it is required to invert 32 of the 64 bits as they are transmitted across the communication link in order to ensure reasonably random bit sequences. In MUX 1.2 and MUX 1.4, the following bits as shown in FIG. 6 are inverted: 03, 04, 06, 09, 14, 16, 18, 19, 20, 22, 23, 27, 28, 29, 30, 31, 34, 35, 37, 40, 45, 47, 49, 50, 51, 53, 54, 58, 59, 60, 61, 62. These bit numbers refer to the 64 bits of the B channel and not the bit numbers of the data burst. Bit 1 is the first transmitted bit of the B channel. When voice is active in the communication link, the B channel bits are randomly changing based on the encoded adaptive differential pulse code modulated (ADPCM) data.

Figure 4:
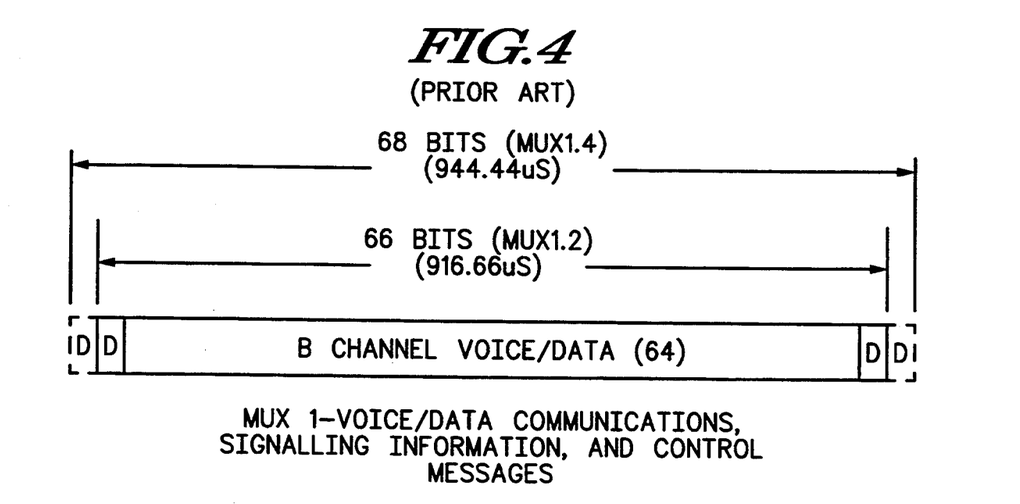
FIG. 4 shows a typical prior art voice/data MUX 1 protocol.

The MUX 1 signaling packet shown in FIG. 4, is invoked from MUX 2 by a control message. MUX 1 is used bi-directionally over an established link to carry D channel (Data) and B channel (speech/data). The SYN (synchronization) channel is nonexistent in this multiplex and therefore should burst synchronization be lost, it cannot be recovered without re-initializing the communication link. MUX 1 supports both 68 bit (referred to as MUX 1.4) or 66 bit (referred to as MUX 1.2) burst structures. It is up to each system manufacturer to decide which of the two to utilize for MUX 1 signaling. MUX 1 data rates are 2.0 kbit/second for MUX 1.4 and 1.0 kbit/second for MUX 1.2. Data bytes in the D (data) channel are aligned in this multiplex so that bytes always start on a frame boundary. In order to ensure random bit sequences in MUX 1, a certain known number of the B channel bits are inversed in each frame.

If the communication link between a cordless telephone and a CT-2 base station is lost (e.g., due to multipath fading, radio frequency interference, etc.) after the link is already in MUX 1 (voice communication has begun), the units (i.e., the base station and handset) must both return to the MUX 3 or to the MUX 2 protocol level in order to re-synchronize with each other (also known as link re-establishment) since resynchronization is not available in MUX 1. This process of moving down to MUX 3 then to MUX 2 and then back to MUX 1 is very time consuming, typically taking over 1 second to accomplish. This causes the handset user to experience a 1 second or greater time frame in which their is no communications. A need thus exists in the art for a method and apparatus which can accomplish synchronization when a communication link is lost in a communication system such as a digital cordless telephone system in a more efficient manner.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

The present invention provides for a pattern detector which in the preferred embodiment is a synchronization word detector that correlates to "n" of 64 bits where "n" is preferably between 24 to 64 bits in order to prevent falsing. The number of bits used for the synchronization word are selected in the preferred embodiment from the 64 B channel bits found while communicating in MUX 1. When a communication link has been deemed bad in either direction while in MUX 1, the transmitting end in the preferred embodiment is capable of muting the transmit B channel information, and generating a synchronization pattern. Preferably the synchronization pattern is formed using the inversion pattern used to randomize the B channel data while in MUX 1. Because the receiving end is not aware of what the transmitting end is currently transmitting, and the B channel data is random, the receiving end's pattern detector will monitor the communication link for sequential synchronization patterns which correlate to 32 of 64 bits of the inverted data. Once the detector detects the second synchronization pattern, the receiver will be realigned to the received synchronization pattern. This resynchronization procedure in accordance with the invention will be explained in more detail later on in this description.

Figure 7:
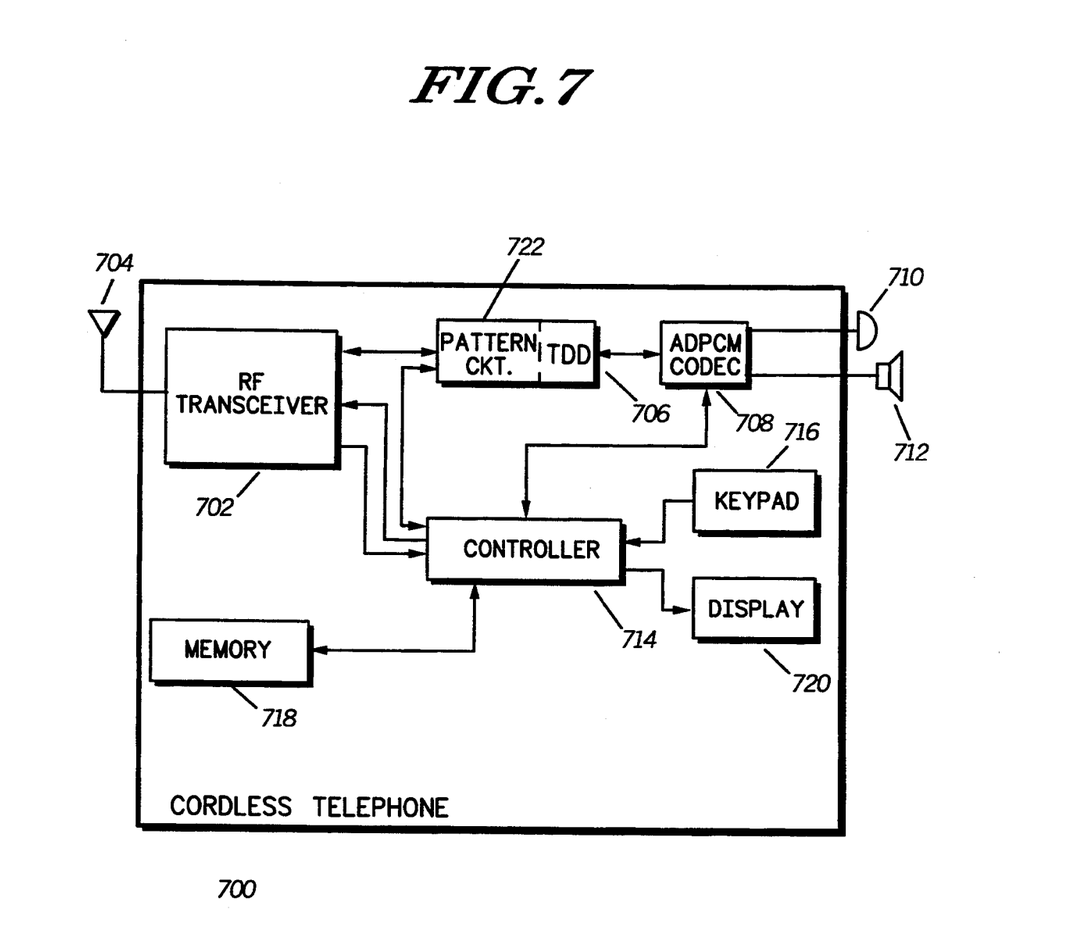
FIG. 7 shows a block diagram of a communication device in accordance with the present invention.

In FIG. 7, a simplified block diagram of a radio such as a cordless telephone 700 in accordance with the present invention is shown. Cordless telephone 700 comprises a well known RF transceiver 702 for transmitting and receiving RF communication signals via an antenna 704. CT2 handsets operate in accordance with the previously mentioned "MPT1375 Common Air Interface Specification" (CAI) which establishes a time-division multiplexed protocol having alternating one millisecond receive and transmit frames separated by guard time segments.

A time division duplexer (TDD) 706 is coupled to transceiver 702 for providing time-division multiplexing and receive/transmit framing of the digital signals. TDD 706 includes a pattern generation and detection circuit 722 in accordance with the invention. Pattern detection and generation circuit 722 will be discussed in detail later on in this description. An adaptive differential pulse code modulator/coder-encoder (ADPCM-/CODEC) 708 receives analog voice signals generated by a microphone 710 and processes them into digital form for transmission. The ADPCM/CODEC 708 also transforms the received digital signals back into analog voice signals which are rendered audible to a user via speaker 712.

A control means such as controller 714 which is programmed in a known manner except for the modifications to obtain the present invention's capabilities, provides operational control for the cordless telephone 700. Controller 714 can be any one of a number of microprocessors or microcontrollers, the controller preferably has input/output capabilities and built-in memory. Controller 714 executes the program which modifies the operation of cordless telephone 700 whenever telephone 700 needs to resynchronize in accordance with the present invention. A handset user interacts with the cordless telephone via a keypad 716. Keypad 716 allows the device user to enable the operational features of telephone 700. A display 720 provides visual interaction for the subscriber. A memory block 722 such as an electrically erasable programmable read-only memory (EEPROM), provides storage of the handset's ID number and other important information. Memory block 722 can also include a RAM portion for the temporary storage of information. The schematic for a CT2 base station is similar to the schematic shown in FIG. 7, except that a base station will typically not have keypad or dispaly sections. Base stations will however have a plurality of RF transceivers and signal decoding sections in order to handle a plurality of handsets at one time.

The synchronization routine of the present invention can also be utilized as will be explained later to provide faster handset hand-offs in a multi-base station environment. Handset hand-offs occur when a cordless handset user is moving from the communication coverage area of one CT2 base station to the communication coverage area of a second CT2 base station. This typically occurs in congested areas such as downtown areas where several base stations are in close proximity to one another. The present invention provides for more efficient handset handoffs in a multibase station environment since the handoffs occur while still in MUX 1.

Figure 10:
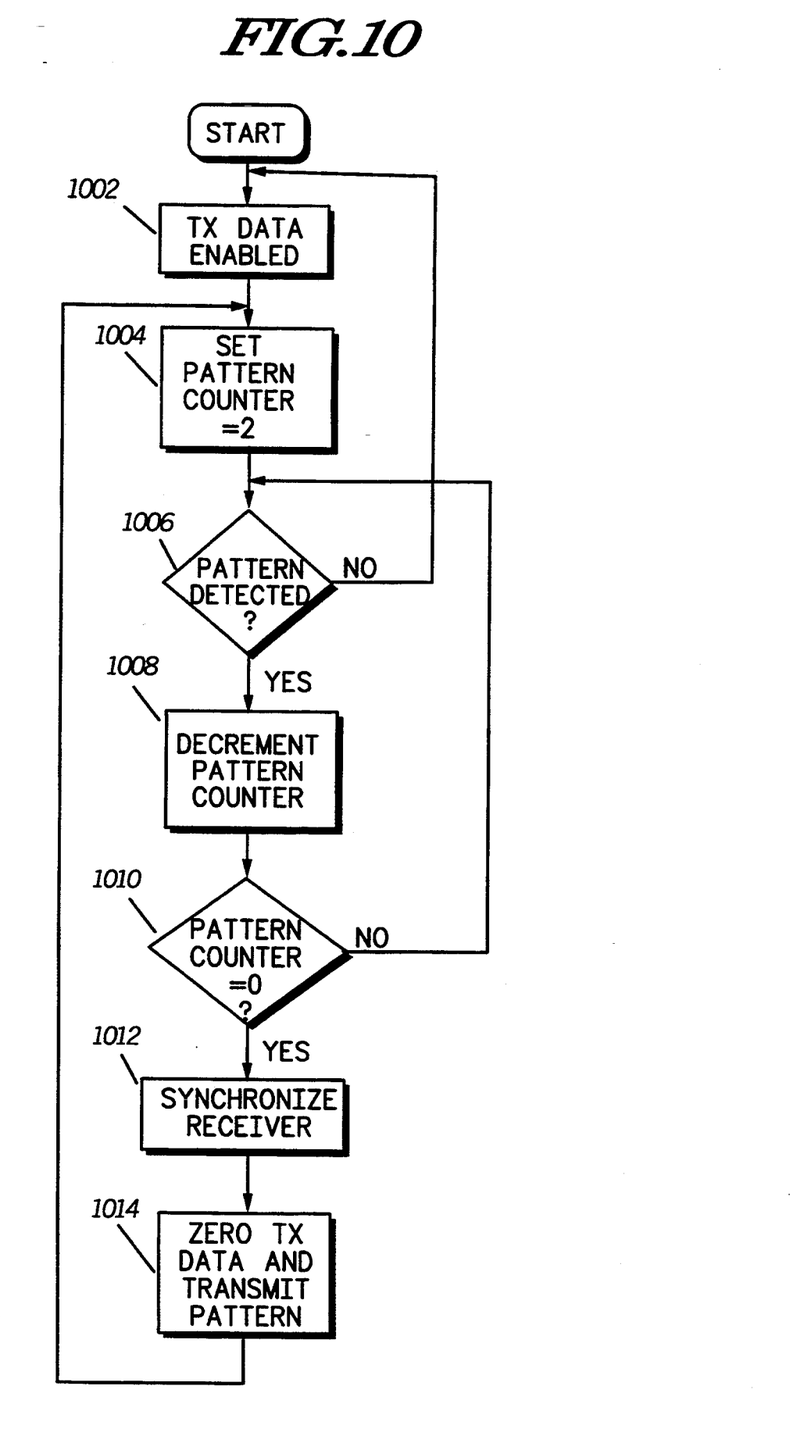
FIG. 10 is a flow chart showing the pattern detection sequence in accordance with the present invention.

Referring now to FIG. 10, a flow diagram showing a pattern detection sequence is shown. For purposes of simplifying the description we will assume that the unit detecting the pattern is a CT2 handset such as handset 840, although a base station would use the same pattern detection algorithm. In step 1002, the handset enables its transmit data in order to transmit information to the base station it has set up communications with. In step 1004, an internal pattern counter is set equal to two. The handset monitors for the inversion pattern of the preferred embodiment in step 1006. If no pattern is detected during the receive frame, the routine returns to step 1002 and more TX data is transmitted by the handset. If the correct pattern is detected in step 1006, in step 1008 the pattern counter is decremented. In step 1010, it is determined if the pattern counter has reached zero. If the pattern counter is not equal to zero, the routine returns to step 1006. If the pattern counter has reached zero, in step 1012 indicating pattern detects in two consecutive frames, the handset's receive section is synchronized to the base station with the help of the inversion pattern. In step 1014, the handset zeros its transmit data and transmits the inversion pattern. After step 1014, the routine returns to step 1004. Transmission of the inversion pattern will continue until the synchronization (inversion) pattern is no longer detected at the receiver in step 1006, at which point the TX data will be enabled in step 1002.

Figure 11:
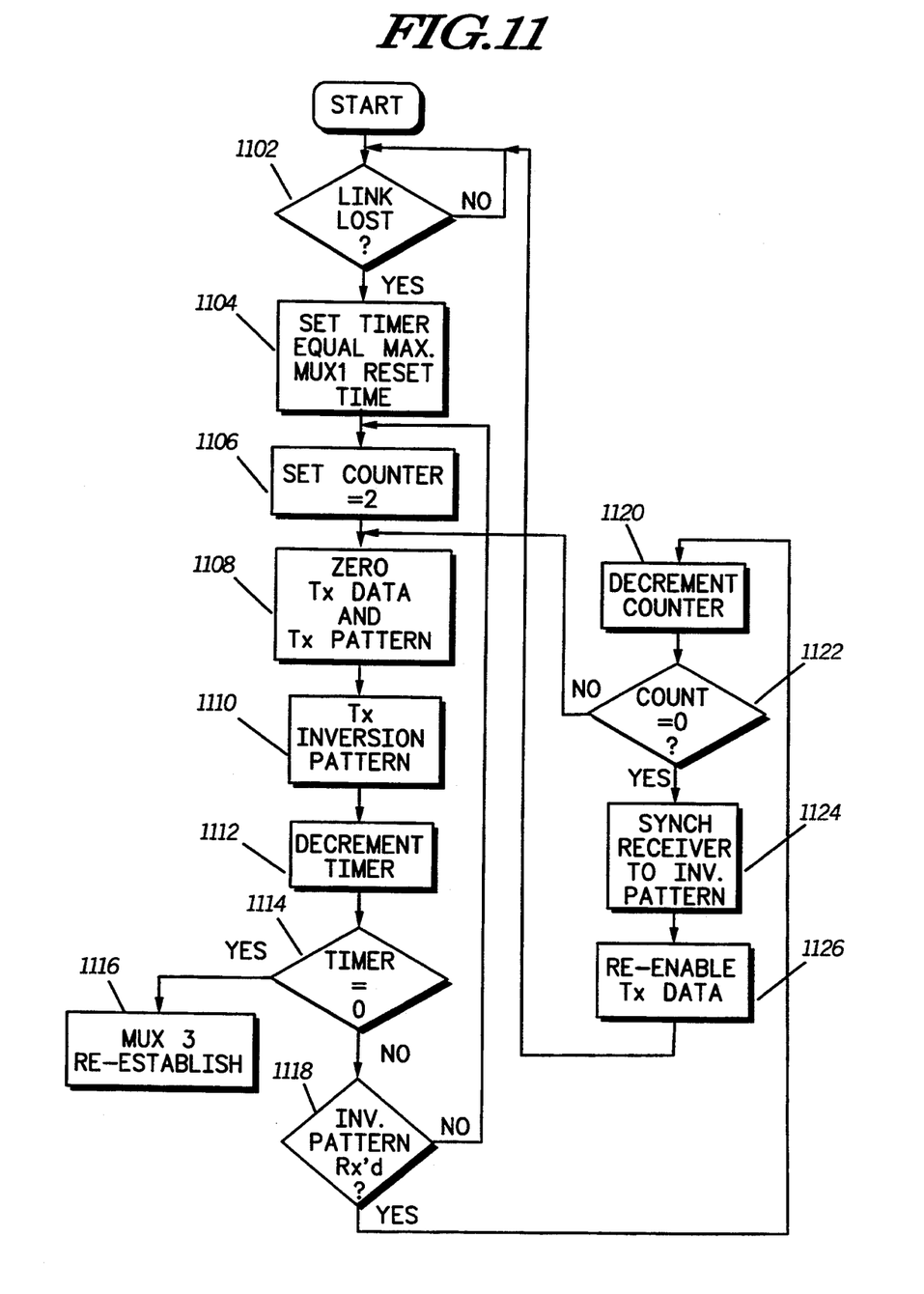
FIG. 11 is a flow chart showing a re-synchronization initiation routine in accordance with the present invention.

In FIG. 11, a flow diagram of how a system resynchronization request is initiated is shown. In step 1102, a unit determines that the communication link is lost. This is accomplished by the unit not being able to decode the receive data. If link synchronization is determined to have been lost, in step 1104 an internal timer which will be referred to as the maximum MUX 1 reset time timer is set. The maximum MUX 1 reset time is preferably set to approximately 300 milliseconds, and informs the unit the maximum length of time it can remain in MUX i in order to attempt resynchronization in MUX 1. The maximum reset time can be adjusted to meet different system requirements. For example, if one wants to stay in MUX 1 for a longer period of time in order to have a better chance of resynchronizing in MUX 1, the maximum reset time can be increased.

In step 1106, an internal pattern counter is set equal to two. In step 1108, the transmit data line starts sending zero data. In step 1110, the inversion pattern is exclusive-or'd with the zero data prior to transmission. In step 1112, the timer is decremented and in step 1114, it is determined if the timer has reached zero. If the timer has reached zero, MUX 1 resynchronization has not been successful and the unit returns to MUX 3 in step 1116 in order to begin a standard link re-establishment sequence. This other or standard link re-establishment as mentioned before takes longer than the resynchroniztion technique of the present invention. If the timer in step 1114 has not reached zero, in step 1118, it is determined if an inversion pattern has been received. If an inversion pattern has not been received, the routine returns to step 1106. If the inversion pattern has been received, the pattern counter is decremented in step 1120. In step 1122, it is determined if the pattern counter has reached zero. If the pattern counter has not reached zero, the routine returns to step 1108. If the pattern counter is however equal to zero, the receiver is synchronized with the inversion pattern that is received. Finally in step 1126, the transmit data is re-enabled and normal communications continue between the base station and the handset in MUX 1.

Figure 8:
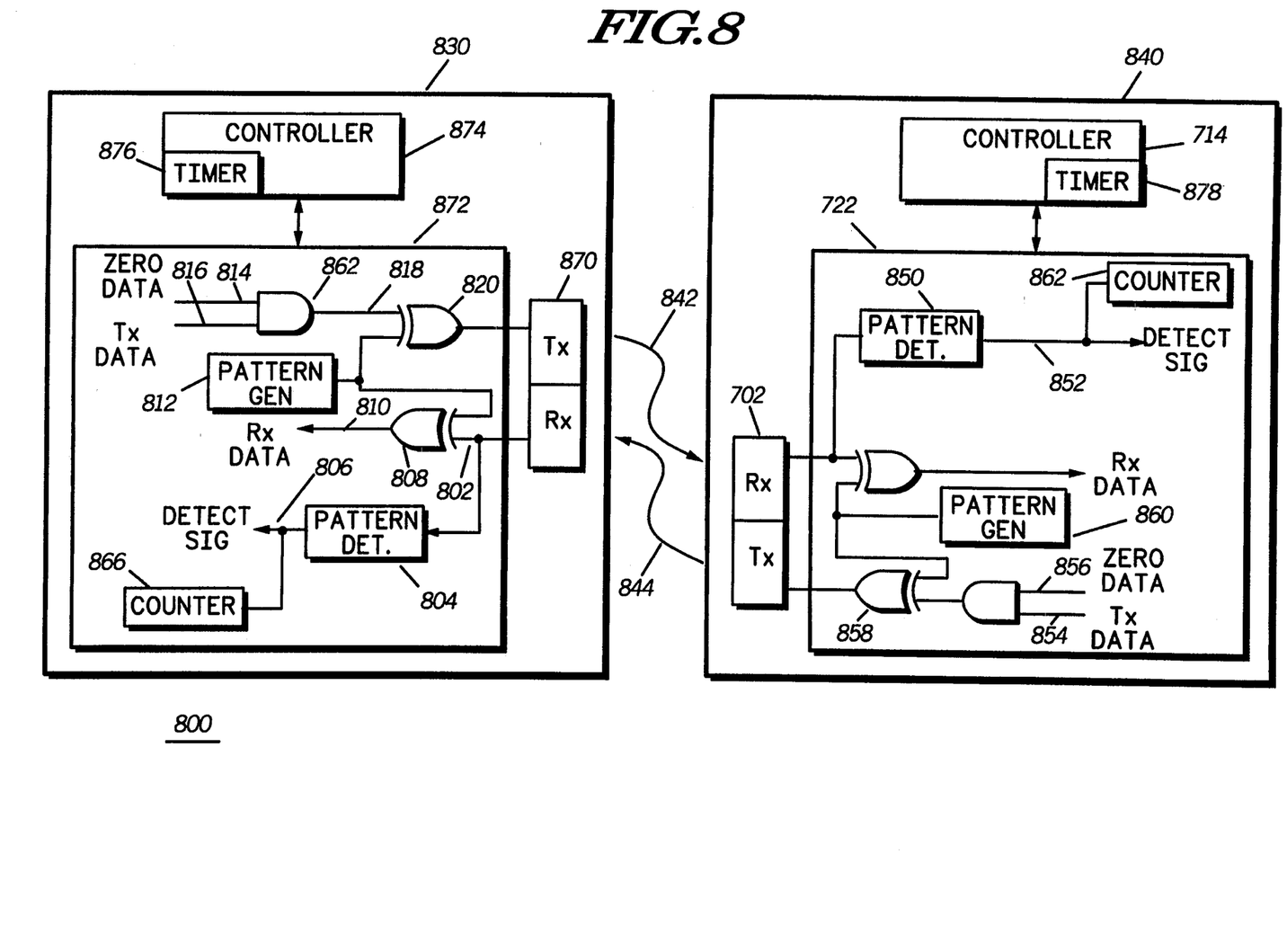
FIG. 8 is a partial block diagram of the communication device shown in FIG. 7 in order to better illustrate the present invention.

In FIG. 8, a simplified block diagram of a communication system 800 shows the relevant portions of a CT2 base station 830 and a CT2 handset 840, in accordance with the invention. FIG. 8 highlights the pattern recognition and detection section 722 found in TDD section 706 (shown in FIG. 7) for handset 840 and similar sections for base station 830 (shown as section 872). Base station 830 communicates with handset 840 via a bi-directional radio frequency communication channel having first 842 and second 844 message flow directions. In order to better understand the invention, an illustrative example will now be discussed. We will begin the example by assuming that base station 830 and handset 840 have already established a communication link in accordance with the CT2 CAI specification, and are in communication with one another using the MUX 1 protocol. We also will assume that a communication problem, such as a multipath fade condition has occurred causing data being sent by handset 840 in MUX 1 not to be properly received at base station 830. For example, the multipath fade condition could have caused a one bit misalignment of the frames being transmitted by handset 840, thereby causing base station 830 to lose synchronization.

On communications initialization, the communications units set a MUX 1 reset timer 876 for base station 830 and 878 for handset 840 found in the unit's respective controller sections 874 and 714 to a specified value, for example 300 milliseconds, and the pattern counters 866 and 862 are set equal to two.

In this particular example once the base station 830 fails to properly receive information in MUX 1 (e.g., it cannot decode data due to loss of synchronization with the transmitting unit) it gates off any transmit data on line 816 which was to be sent to handset 840. This is accomplished by stopping data flowing from the base stations ADPCM/CODEC 708 (not shown) from being sent to the base station's TDD (similar to TDD section 706). At the same time, base station 830 mutes or zeros the B channel data on line 818 which is provided by AND gate 862 by asserting the zero data control low on line 814. The zero data on line 814 is then exclusive-or'd using exclusive-or gate 820 with a known pattern generated by pattern generator 812. This known pattern in the preferred embodiment is the presently used inversion pattern discussed with respect to FIG. 6. That is bits 03, 04, 06, 09, 14, 16, 18, 19, 20, 22, 23, 27, 28, 29, 30, 31, 34, 35, 37, 40, 45, 47, 49, 50, 51, 53, 54, 58, 59, 60, 61, 62 are inverted or turned into ones. In a typical CT2 system the inversion pattern is used to guarantee randomization of the transmitted data. As mentioned before, depending on the system design anywhere from zero to 64 (all of the B channel bits) can be used as the synchronization pattern. Once the pattern and zero data are exclusive-or'd by gate 820, the data is transmitted by transceiver 870 as a synchronization pattern to handset 840.

The zeroing or muting of the transmit data results in a mute of voice at the receiving end unit, so that the resynchronization process is essentially transparent to the voice user. If the synchronization pattern is different from the inversion pattern, noise will result in the audio at the receiving unit during resynchronization. In addition, instead of "ORing" zeros with the known inversion pattern as done in the preferred embodiment, ones (1's) could be "ORed" with the inversion bits and the inverse of the inversion pattern could be detected by the units. The use of all ones or zeros result in a mute of voice signals and thus will make the resynchronization process transparent to the users of the communication units undergoing resynchronization.

The transmitted information is then received by handset 840. Once the data is demodulated by the receiver section of handset transceiver 702, pattern detector 850 samples the information to see if it can detect the pattern generated by pattern generator 812. This pattern detection is continuously enabled since handset 840 does not know at what point the MUX 1 link can go out of synchronization. Since the inversion pattern had been exclusive-or'd with zero data by base station 830, pattern detector 850 will detect the pattern since it knows the pattern it needs to decode is the known inversion pattern. Once the pattern is detected, pattern detector 850 generates a pattern detect signal 852 which informs the handset that the pattern has been properly detected. Handset 840 also decrements counter 862 as mentioned in FIG. 11. At this point, handset 850 now knows that there is a synchronization problem with the communication link, and specifically in communication direction 844. Handset 840 continues to transmit regular data to base station 830. Base station 830 receives the data from handset 840 and still determines that it is out of synchronization with handset 840.

Base station 830 then sends out a second inversion pattern to handset 840. Handset 840 receives the second inversion pattern and decrements counter 862 a second time. Since counter 862 had been originally set to a value of two, counter 862 is now equal to zero and controller 714 informs handset 840 to resynchronize to base station 830 using the received inversion (synchronization) pattern. Once a second pattern detect signal 852 is generated at handset 840, handset 840 stops sending out (gates off) transmit data (TX data) on line 854. Handset 840 also mutes the B channel data by asserting the zero data control line low on line 856. This zero data, like that discussed with reference to base 830, is exclusive-or'd, by logic gate 858 with the same synchronization pattern previously received, which is generated in handset 840 by pattern generator 860. The inversion pattern (synchronization pattern) is then transmitted by transceiver 702 to base station 830.

If no other problems beside synchronization exist on the communication link (e.g., one unit out of communication range, etc.), base station 830 will receive the information. The received information 802 will then be sampled by pattern detector 804, which will detect the pattern, and generate a pattern detect signal 806. The received information 802 will also be sent to exclusive-or gate 808 for exclusive-oring information 802 with the inversion pattern generated by pattern generator 812 in order to produce receive data 810. Base station 830 will then exchange inversion patterns with handset 840. The reception of the second inversion pattern at base station 830 will cause base station 830 to realign or synchronize its receive frame to the received pattern in the same way that handset 840 resychronized. Once base station 830 is resynchronized, base station 830 and handset 840 begin exchanging regular data (e.g., voice information, etc.) on MUX 1.

As been shown, the use of the present invention allows for a more efficient way of re-establishing resynchronization on a presently established communication link. There is no need to leave MUX 1 as is the case in a prior art CT2 system in order to resynchronize the two communication units to each other. The present invention allows for faster resysnchronization since the units do not have to go back to MUX 3 in order to begin a link re-establishment procedure.

Figure 9:
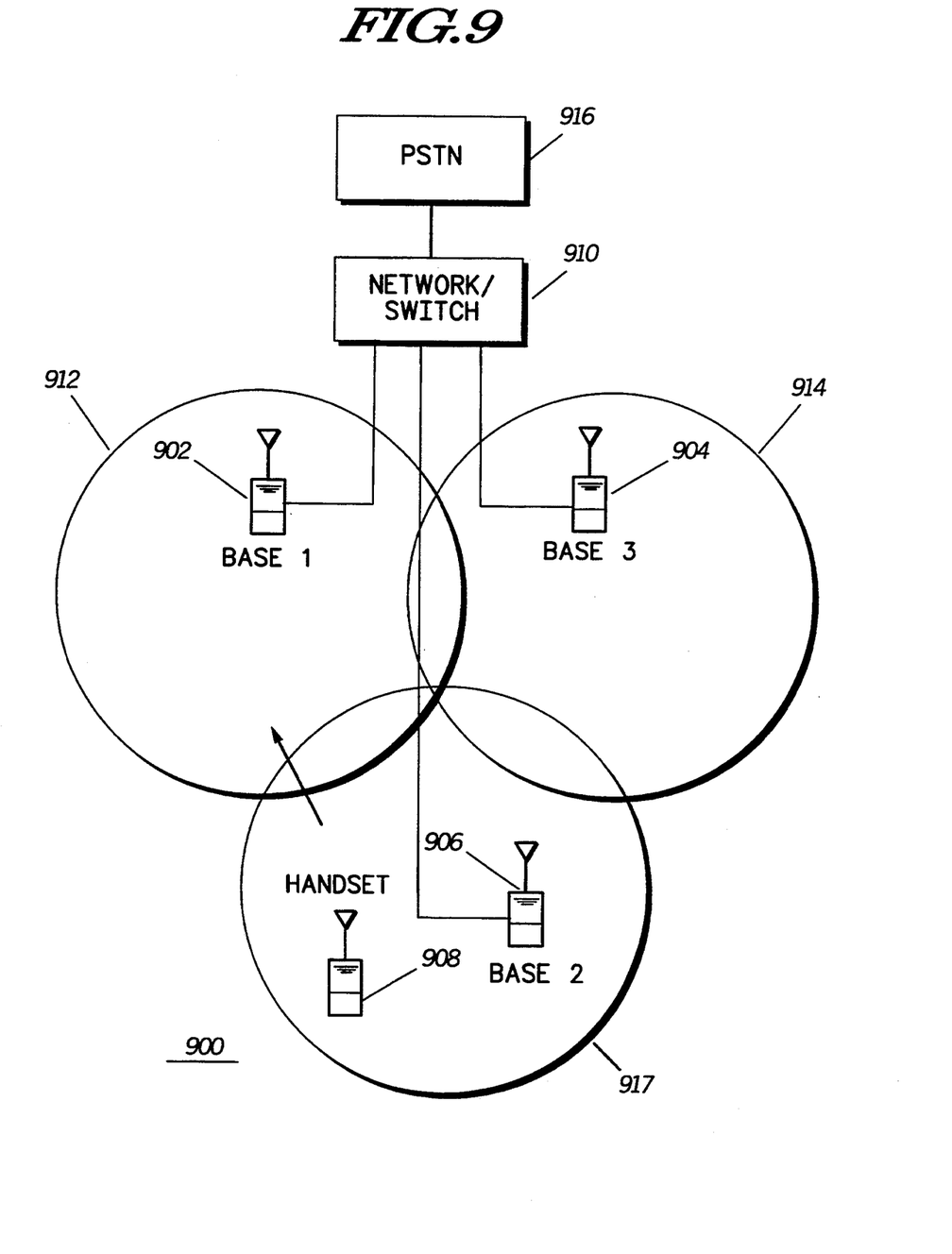
FIG. 9 shows a diagram of a communication system in accordance with the invention.

Referring now to FIG. 9, there is shown a communication system such as a cordless telephone system 900 in accordance with the present invention. Cordless telephone system 900 is preferably a second generation cordless telephone (CT2) system. Cordless telephone system 900 comprises one or more base stations (CFPs) 902, 904 and 906, and at least one handset (CPPs) 908. Each of the CFPs 902, 904 and 906 is coupled to a network controller 910. Network controller 910 has supervisory control over base stations 902, 904 and 906. In the case of a CT2 system network controller 910 also provides access to the public switched telephone network (PSTN) 918.

Once handset 908 gathers access to one of the RF channels provided by a particular base station 906, the base station sets up the communication link between the requesting handset and the PSTN 916, thereby allowing a handset user to make a standard telephone call to a land-line party. In system 900, base station 902 is shown to have a typical operating range shown by communication coverage area 912, base station 904 has a coverage area 914, and base station 906 has a coverage area 917.

When handset 908 comes into range of a base station coverage area, handset 908 can then attempt to gain access to one of the base stations communication channels. Cordless telephone system handsets are typical very low power portable communication units having a maximum output power rating in the order of 10 milliwatts (mW). Upon requesting access to a base station such as base station 906, handset 908 will scan the base station's RF channels in order to get an available channel (e.g., a channel which is not busy). Handset 908 then transmits a link request in MUX 3 which the base station can grant using a MUX 2 return transmission. This is followed by a MUX 2 handshake between the two units and a handset ID check, in order to establish the identification of the particular handset that is originating the call. The handset ID is used for both billing purposes and to ensure that only authorized units are using the system. Finally, the radio enters MUX 1 in order to commence voice communications.

Once handset 908 has established voice communications in MUX 1, it may be the case that the handset user enters the coverage area of base station 902 (e.g. by walking a few meters in one direction while talking on his cordless telephone handset). In a centralized control system as shown in FIG. 9, hand-off between base station 906 and base station 902 requires a nearly seamless communication channel transition between the two base stations. As handset 908 leaves coverage area 916 and enters coverage area 912, the receive signal strength (RSS) of the signals transmitted by handset 908 and received at base station 906 decrease in signal strength. Network controller 910 is informed by base station 906 of the reduced signal level and network controller informs adjacent base stations 902 and 904 to begin monitoring on the same channel frequency (if the channel frequency is not already in use) for handset 908.

Base stations 902 and 904 then report any receive signal strength levels that they begin detecting to network controller 910. When the RSS detected at base station 902 is greater than that detected at base station 906, network controller 910 instructs base station 906 to transfer the call to base station 902. Base station 906 in accordance with the invention then informs handset 908 that the base station hand-off is taking place and what frequency to switch to, or to remain on the same frequency. Handset 908 is also instructed to begin muting its transmit B channel (voice) messages. At the same time that base station 906 has informed handset 908 to mute its voice messages, network controller 910 instructs base station 902 (station with highest received signal strength level) to begin the hand-off process.

As base station 906 terminates its communications with the handset, base station 902 begins its communications to handset 908 in MUX 1 with the B channel data muted. The handset then synchronizes to base station 902 in MUX 1 in a similar fashion as discussed with the communication devices in FIG. 8. Handset then resynchronizes with base station 902 and the base station's receiver synchronizes with the transmissions of handset 908. By providing for synchronization in MUX 1 during the hand-off between base 906 and base station 902, a considerable amount of time is saved as compared to the prior art cordless telephone system in which the handset would have had to drop down to MUX 3 or MUX 2 in order to re-synchronize with the new base station.

Although in the preferred embodiment the synchronization pattern used is the 32 bit randomizing inversion pattern used in the B channel as discussed with respect to FIG.6, the inversion pattern generated by generators 812 and 860 and pattern detectors 804 and 850 can be designed to be programmable in the numbers of bits which are inverted. Programmable synchronization patterns would allow for specific call reference ID's to be used by the base station and handset to identify the communication link. If programmable synchronization patterns are used, the synchronization patterns could be programmed at the time of link establishment between a base station and a handset. Unique synchronization patterns would allow for reliable hand-off and less unit validation after the link is re-established. In addition, programmable synchronization patterns would add a level of security to the end user since the synchronization could be changed more frequently.

In summary, the present invention provides a method and apparatus for synchronizing a set of communication units in a digital cordless telephone system in a more efficient manner. The method and apparatus for synchronization is applicable when a communication link is lost and also for synchronizing the hand-off of a cordless telephone from one base station to another one. The synchronization in accordance with the preferred embodiment of the invention is accomplished by taking the known B-channel inversion pattern and combining it with the B-channel inhibit output to form a unique B-channel word which is applicable to both fast re-synchronization and handset hand-offs. The present invention cuts down the time for resynchronizing when a communication link has lost synchronization as compared to the present CT2 re-synchronization routine, and therefore provides system users with a better performing system. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for re-establishing synchronization in a previously established radio communication channel between first and second radio communication devices after synchronization between the first and second radio communication devices has been lost, the method comprising the steps of:
 (a) determining at the first radio communication device that synchronization with the second radio communication device has been lost;
 (b) transmitting a synchronization pattern from the first radio communication device to the second radio communication device;
 (c) receiving the synchronization pattern at the second radio communication device;
 (d) determining at the second radio communication device if the synchronization pattern received matches a predetermined synchronization pattern;
 (e) transmitting the synchronization pattern from the second radio communication device to the first radio communication device;
 (f) receiving the synchronization pattern at the first radio communication device;
 (g) determining at the first radio communication device that the synchronization pattern received matches the synchronization pattern previously transmitted by the first radio communication device in step (b);
 (h) repeating steps (b) to (e) if in step (g) it is determined that the synchronization pattern received matched the previously transmitted synchronization pattern; and
 (i) resynchronizing the first communication device to the second communicate using the synchronization pattern if the synchronization pattern received at the first communication device during step (h) matches the predetermined synchronization pattern.

2. A method as defined in claim 1, wherein the transmission of the synchronization pattern in step (b) comprises:
(b1) generating a zero data message having a predetermined number of bits and all the bits are zeros;
(b2) generating a pattern message having the same number of bits as the zero data message, with select bits of the pattern message set equal to one;
(b3) combining the zero data message with the pattern message in order to produce the synchronization pattern.

3. A method as defined in claim 1, wherein the first and second radio communication devices operate in a cordless telephone system.

4. A method as defined in claim 1, wherein the synchronization pattern transmitted between the first and second communication devices is programmable, and the first and second communication devices decide on the synchronization pattern to be used in the case that resynchronization is required when the radio communication channel between the first and second communication devices is originally established.

5. A method as defined in claim 2, wherein step (b3) comprises exclusive-oring the zero data message with the pattern message in order to produce the synchronization pattern.

6. A cordless telephone system wherein first and second cordless telephone devices communicate with each other over an established radio communication channel, comprising:
at the first cordless telephone device:
a circuit for determining that synchronization with the second cordless telephone device has been lost;
muting circuit coupled to the circuit for determining that synchronization has been lost, the muting circuit muting any data to be sent to the second cordless telephone device upon determining that synchronization with the second cordless telephone device has been lost;
pattern generator responsive to the muting circuit for generating a bit pattern upon determining that synchronization with the second cordless telephone has been lost;
transmitter responsive to the pattern generator for transmitting the bit pattern to the second communication device;
at the second cordless telephone device:
receiver for receiving the bit pattern from the first communication device;
pattern detector for determining that the bit pattern received matches a predetermined bit pattern, the pattern detector generates a pattern detection signal upon the pattern detector determining received matches the predetermined bit pattern;
muting circuit coupled to the means for determining that synchronization has been lost for muting any data to be sent to the first cordless telephone device;
pattern generator responsive to the pattern detection signal for generating a bit pattern which is the same as the bit pattern which was received; and
transmitter coupled to the pattern generator for transmitting the bit pattern to the first cordless telephone device.

7. A cordless telephone system as defined in claim 6, wherein the first cordless telephone device further comprises:
receiver for receiving the bit pattern transmitted by the second cordless telephone device; and
pattern detector for determining if the pattern detected is the same as the pattern previously generated by the pattern generator.

8. A cordless telephone system as defined in claim 6, wherein the muting circuit in both the first and second cordless telephone devices mute the data by providing zero bit patterns having a predetermined number of zero bits to the transmitters in the first and second cordless telephone devices.

9. A cordless telephone system as defined in claim 6, wherein the bit pattern used by the first and second cordless telephone devices is an inversion pattern used during voice communication between the first and second cordless telephone devices.

10. A cordless telephone system as defined in claim 6, wherein the bit pattern used by the first and second cordless telephone devices has a programmable length and the length of the bit pattern is decided by the first and second telephone devices when the communication channel is first established.

11. A cordless telephone system as defined in claim 1, wherein one of the first and second cordless telephone devices is a base station and the other one of said first and second cordless telephone devices is a handset.

12. A cordless telephone system as defined in claim 8, wherein the zero bit patterns are combined with a predetermined inversion pattern to produce the bit patterns transmitted by the first and second cordless telephone devices.

13. A method for synchronizing in a cordless telephone system a cordless handset which is presently synchronized to a first, base station to a second base station, the method comprising the steps of:
determining the receive signal strength (RSS) level of transmissions sent by the handset at the first and second base stations;
transmitting a transfer message to the cordless handset from the first base station when the received signal strength of the handset's transmissions is higher at the second base station than at the first base station;
muting transmissions from the cordless handset in response to the reception of the transfer message at the cordless handset;
exchanging a synchronization bit pattern between the cordless handset and second base station;
synchronizing the second base station and the cordless handset to each other using the synchronization bit pattern; and the synchronization bit pattern used to synchronize the cordless handset to the second base station is formed using a predetermined inversion pattern used by the cordless telephone system to randomize messages transmitted by the cordless handset and second base station.

14. A method for resynchronizing a first cordless telephone device operating in a cordless telephone system having first and second cordless telephone devices, the method comprising the steps of:
at the first cordless telephone device:

determining that synchronization with the second cordless telephone device has been lost;

setting a maximum resynchronization timer and a synchronization pattern counter upon determining that synchronization with the second cordless telephone device has been lost;

transmitting a synchronization pattern to the second cordless telephone device;

determining if the maximum resynchronization timer has reached a predetermined value;

receiving a synchronization pattern transmitted from the second cordless telephone device;

adjusting the synchronization pattern counter upon receiving the synchronization pattern; and synchronizing the first cordless telephone device to the second cordless telephone device if the synchronization pattern counter has reached a predetermined value.

15. A method for resynchronizing as defined in claim 14, wherein using a different resynchronization technique to synchronize the first and second cordless telephone devices if the maximum resynchonization timer reaches a predetermined value before the synchronization pattern counter reaches its predetermined value.

16. A method for resynchronizing as defined in claim 14, wherein the step of synchronizing the first cordless telephone device to the second cordless telephone device comprises the steps of:

determining if the synchronization pattern received at the first communication device matches a predetermined synchronization pattern; and using the synchronization pattern to synchronize the first communication device to the second communication device.

* * * * *